(12) United States Patent
Modi et al.

(10) Patent No.: US 8,078,705 B2
(45) Date of Patent: Dec. 13, 2011

(54) KEY-CONFIGURED TOPOLOGY WITH CONNECTION MANAGEMENT

(75) Inventors: Prashant Modi, Pleasanton, CA (US); Kathryn Hampton, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1560 days.

(21) Appl. No.: 10/818,549

(22) Filed: Apr. 5, 2004

(65) Prior Publication Data

US 2005/0226248 A1    Oct. 13, 2005

(51) Int. Cl.
   *G06F 15/173* (2006.01)
(52) U.S. Cl. ......... 709/223; 709/212; 709/216; 709/225
(58) Field of Classification Search ........................ None
   See application file for complete search history.

(56) References Cited

U.S. PATENT DOCUMENTS

| | | | | |
|---|---|---|---|---|
| 5,224,163 A * | 6/1993 | Gasser et al. | ................... | 380/30 |
| 5,784,464 A * | 7/1998 | Akiyama et al. | ............. | 713/155 |
| 6,134,591 A * | 10/2000 | Nickles | .......................... | 709/229 |
| 6,360,262 B1 * | 3/2002 | Guenthner et al. | ........... | 709/226 |
| 6,510,236 B1 * | 1/2003 | Crane et al. | ................... | 382/116 |
| 7,257,731 B2 * | 8/2007 | Hunt et al. | ........................ | 714/4 |
| 2002/0169986 A1 * | 11/2002 | Lortz | ............................. | 713/201 |
| 2002/0178364 A1 | 11/2002 | Weiss | | |
| 2003/0084171 A1 | 5/2003 | de Jong et al. | | |
| 2004/0093411 A1 * | 5/2004 | Elzur et al. | ..................... | 709/224 |
| 2005/0149940 A1 * | 7/2005 | Calinescu et al. | ............ | 718/104 |

FOREIGN PATENT DOCUMENTS

| GB | 2386291 | 9/2003 |
|---|---|---|
| GB | 2386291 A | 9/2003 |

OTHER PUBLICATIONS

RFC 2616, Jun. 1999, Network Working Group.*
RFC 2396, Aug. 1998, Network Working Group.*
British Patent Office; Patent Search Report for Appl. GB0506547.9; dated Jul. 28, 2005.
CN Office Action in co-pending CN Application No. 200510071785, and entitled "Key-Configured Topology With Connection Management" having a date of mailing of Apr. 3, 2009.
China Office Action, translated, dated Apr. 3, 2009, 13 pages.
Great Britain Office Action, dated Jul. 17, 2006, 3 pages.
International Search Report, dated Jul. 29, 2005, 4 pages.

* cited by examiner

*Primary Examiner* — Krista Zele
*Assistant Examiner* — Matthew S Lindsey

(57) ABSTRACT

Systems, methodologies, media, and other embodiments associated with key-configured topology connection management are described. One exemplary system embodiment includes a logic for mapping a resource to a port through which it can be accessed and a logic for determining whether a requestor will be granted a connection to the machine on which the resource resides based, at least in part, on membership in a key-configured topology. Membership in the key-configured topology may be determined by a connection management logic analyzing a key provided by the requestor in a request related to accessing the resource. The key may be internally generated by a key maintenance logic.

13 Claims, 11 Drawing Sheets

KEY-CONFIGURED TOPOLOGY WITH CONNECTION MANAGEMENT

BACKGROUND

A data communications component like a NIC (network interface card) or a remote direct memory access NIC (RNIC) may have limited resources like ports, memory, connections, licenses, processor cycles, and so on. Undesired (e.g., unauthorized) consumption of these limited resources may negatively impact data communication functionality provided by a data communications component. For example, while an RNIC may be designed to support RDMA, if resources that support RDMA are unavailable due to undesired consumption, then the RDMA feature may be unavailable.

RDMA is a NIC feature that lets one computer directly place data into the memory of another computer with minimal CPU (central processing unit) intervention. Rather than a computer's CPU moving data, the CPU may program an RNIC to handle a desired data transfer. The RNIC moves the data and notifies the CPU when the transfer is complete. The CPU is less involved in the data transfer and has more cycles available for other concurrent tasks, thereby improving overall functionality in the RDMA configured computer. However, to benefit from RDMA, an RNIC may require relatively expensive and thus limited high speed internal memory. If limited resources are used up, then the RNIC may not be able to provide the RDMA services that it was designed to provide. While RDMA is described, it is to be appreciated that other data communication and networking functions can be negatively impacted by undesired resource consumption.

In some network protocols (e.g., TCP/IP (Transmission Control Protocol/Internet Protocol), UDP (User Datagram Protocol)), a port represents a logical endpoint. A port may be used by a client to specify a specific server program with which it desires to interact or a specific server resource that it wishes to access. For example, a port may be associated with an RDMA service.

To facilitate making connections over a computer network via ports, some ports may have numbers and/or addresses that are pre-assigned. These types of ports may be called "well-known ports" and the first actions taken when establishing a connection may involve these "well-known" ports. One well-known port may be associated with a port mapper that facilitates finding and/or interacting with an available service. A port mapper may be implemented in software, firmware, hardware, and combinations thereof. A port mapper may map a resource, program, service, and so on to a transport-specific port number that can be made known to a requesting client via mapping data distributed in response to a request for mapping data. This facilitates a client dynamically binding to, using, and/or communicating with the mapped programs, services, resources, and so on. However, unprotected distribution of mapping data can lead to undesired consumption of limited networking resources.

A requesting client may communicate via a well-known port with a port mapper to request mapping data concerning with which server port a resource is associated. The requesting client may receive the port/resource mapping data from the port mapper and then request that a connection be established to facilitate accessing the resource by using the provided mapping data. However, not all connections are desirable. Connections consume resources, and a connection may be acquired by an undesirable and/or mis-appropriating client. Once the connection is established, it may persist until disconnected by the client or until an error occurs. Similarly, a connection may be acquired unwisely or in an untimely manner, which can lead to undesired consumption of limited resources, which can in turn lead to undesired results.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
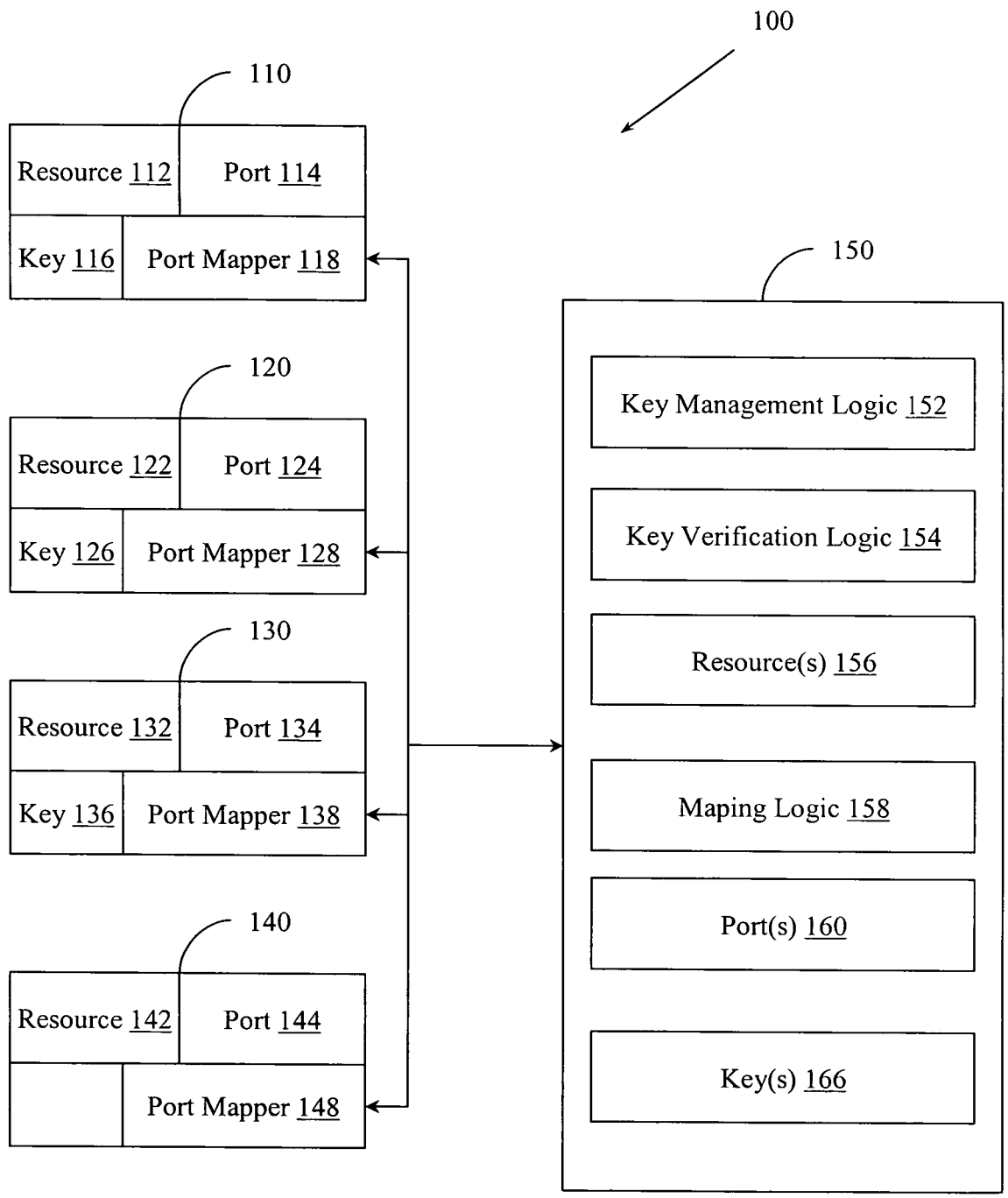
FIG. 1 illustrates an example set of nodes that may be members of a key-configured topology.

Example systems and methods illustrate key-based connection management for nodes in a key-configured topology. The nodes (e.g., client computers, server computers, networked computers, printers, telephones) may share a common set of group membership privileges in an open network like a TCP/IP based network. Example systems and methods illustrate establishing connections between the nodes in a manner that facilitates limiting undesired consumption of resources like memory, licenses, connections, processor cycles, and so on. The connections may employ a preferred protocol within a desired (e.g., open) network and exclude other nodes over that preferred protocol on that network.

Some communication protocols may be vulnerable to unauthorized connections (e.g., Denial of Service (DoS) attacks). To reduce this vulnerability, membership in a key-configured topology based on possessing a key generated by a key-configured topology key management service can be implemented for nodes that wish to communicate via the otherwise vulnerable protocol. Communication between nodes within the group may be enabled when the key is exchanged and validated. Nodes that have the key may be allowed access to a protected member node or resource while nodes that do not have the key may be prevented from establishing a connection to a protected node using a certain protocol. Nodes that do not have the internally generated key may be prevented from requesting mapping information, establishing connections, and/or communicating with nodes that are members of the group using the otherwise vulnerable protocol. However, fallback processing (e.g., processing over a secondary protocol when the desired protocol is not available) may allow an unauthorized node to communicate with a member of the key-configured topology using a different networking protocol. A connection made using the fallback protocol may not provide the same access to a resource that is available via the networking protocol preferred by the group members.

Protection against unauthorized use like that encountered during a DoS attack is one use of key-configured topology connection management. Selectively controlling whether nodes are allowed to communicate via a specific higher level protocol when there is no other physical or logical barrier may be another use. For example, whether a key-configured topology member node may communicate via a specific port and/or protocol may be controlled based on time-of-day, load, current number of users, maintenance schedules, and the like. Thus, key-configured topology connection management may provide a fine grained control over resources associated with a data communication component like an RNIC. The fine granularity may facilitate, for example, blocking access via a first protocol/port/card to a first resource (e.g., database, RDMA memory, RDMA interface) while permitting access via a second protocol/port/card to a second resource through fallback processing. Additionally, and/or alternatively, the fine granularity may facilitate blocking access to the first resource via the first protocol, but may allow gathering information about why the access was blocked via a second protocol. This may be employed, for example, when access is blocked due to load restrictions rather than to the request being denied for an invalid key. By way of illustration, since some resources may be managed on a per RNIC basis, resource conservation techniques may make some resources temporarily unavailable to an otherwise authorized requestor (e.g., requestor with valid key). If information about the reason for the denial is available to the otherwise authorized requester, then that requestor may take actions like trying again later, seeking a connection to a similar resource available via a different RNIC, and so on.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a storage medium that participates in directly or indirectly providing signals, instructions and/or data. A computer-readable medium may take forms, including, but not limited to, non-volatile media or volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software implemented in a computer-readable storage medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software implemented in a computer-readable storage medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Software", as used herein, includes but is not limited to, one or more computer or processor instructions stored as processor executable instructions on a computer-readable storage medium that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates a set of nodes 100 that may be members of a key-configured topology or a certain group within a key-configured topology. The set of nodes 100 includes nodes 110, 120, and 130 that include respectively keys 116, 126, and 136 that can be examined to determine whether a node is a member of a key-configured topology group. Node 140 does not include a key. Thus, a node and/or a logic associated with the node can determine that node 140 is not a part of a key-configured topology because it has no key while nodes and/or logics may perform additional actions to determine whether a node with a key is a member of a key-configured topology group.

Node 110 includes a resource 112 and a port 114. A mapping between the resource 112 and the port 114 can be made, for example, by port mapper 118. Nodes 120 and 130 include similar components. Port mapper 118 may also act as a first line of defense that determines whether to selectively distribute data concerning the mapping between the resource 112 and the port 114 based on comparing key 116 to a key received from a requesting node. For example, if node 120 makes a request for data concerning the mapping between resources and ports on node 110, node 120 will include key 126 in the request. Then port mapper 118, and/or another logic (not illustrated) on node 110 may examine the copy of key 126 to determine whether node 110 and node 120 belong to a common key-configured topology group. If so, then port mapper 118 may provide the mapping data and subsequently may allow a connection to be made between node 110 and node 120. If not, then node 120 will not be provided mapping data. However, node 120 may be able to establish a fallback connection to node 110. Using the fallback connection, node 120 may be able to communicate with node 110, however it may not be able to employ a preferred network protocol available to key-topology configured group members and/or may not be able to access resource 112 through port 114.

Node 150 illustrates a node with a system configured to facilitate preventing the unauthorized consumption of networking resources like resource 112, 122, 132, and 156. Node 150 includes a key management logic 152 configured to receive and store a key 166 that is configured to facilitate determining whether a node that attempts to consume a resource like resource 156 is part of a key-configured topology group that is authorized to consume the network resource 158. In one example, the port mapper 118 may include a key management logic configured to establish and store key 118 that can control whether a connection will be granted to node 110 and/or whether access will be granted to resource 112 via port 114 using a preferred protocol. In one example, a key management logic is part of the port mapper, as illustrated in node 110, while in another example, a key management logic 152 may be a separate logic from mapping logic 158 as illustrated in node 150. Node 150 also includes one or more ports 160.

Node 150 also includes a key verification logic 154 configured to determine whether a node that attempts to acquire information about a network resource like resource 156 or to establish a connection associated with consuming a network resource like resource 156 is part of a key-configured topology group that is authorized to consume the network resource 156. For example, port mapper 118 may include a key verification logic configured to determine whether a key received in a mapping data and/or connection request correlates correctly with key 116 and thus whether a connection to node 110 will be granted and/or whether access to resource 112 through port 114 via a desired networking protocol will be allowed. In one example, like that illustrated in node 110, a key verification logic may be a part of port mapper 118 while in another example, like that illustrated in node 150, the key verification logic 154 may be a separate component from mapping logic 158.

Thus, in one example, nodes like node 110 and node 150, as implemented in hardware, firmware, software, and/or combinations thereof, may include means like key management logic 152 for providing a key that facilitates determining whether a client node is a member of a key-configured topology group to which a server node belongs, means like key verification logic 154 for analyzing the key to determine whether a client node that makes a request that will lead to the consumption of a server resource is a member of the key-configured topology group to which the server node belongs and means like key verification logic 154 for rejecting a request that will lead to the consumption of a server resource if the requesting client node is not a member of the key-configured topology to which the server node belongs, as determined by analyzing the key.

In one example, an interface like a graphical user interface (GUI) may facilitate actions like, specifying group membership parameters, establishing a key, distributing a key, and so on. The GUI may receive, for example, an alpha-numeric passphrase (e.g., password) from which an internal key can be generated. Thus, it is to be appreciated that "key", as used herein, refers not to a user-supplied data but rather to a value, byte, bit-code, and/or other similar computer-readable entity produced by using a user-supplied data (e.g., password) or system supplied data (e.g., random number) as an input to a key-generating logic. The key may then be employed by the nodes in a key-configured topology to perform actions like validating membership in the group, allowing connections to be setup between nodes, and so on. In one example, the key, group memberships, connection control and so on may be applied to individual protocol interfaces, teamed protocol interfaces with single assigned protocol addresses, teamed protocol interfaces with multiple assigned protocol addresses, and so on. While a GUI is described, it is to be appreciated that key management may include interactions with scripting-based systems, policy-based systems, and/or other systems.

In one example, a node may be a member of multiple key-configured topologies where the topologies are isolated from each other within the node. For example, the node may have multiple keys that provide access to multiple topology groups while not providing for interaction between the topologies. In the example, if a key is deleted at a node, then the existing connections based on that key may be immediately terminated and membership in the topology group(s) may be automatically cancelled. In another example, nodes may be self-aware of their status with respect to membership in a key-configured topology. For example, a node may become aware that it has no key and that it is only able to create fallback connections with certain other nodes. Thus, the key-configured topology may be administered with the knowledge of the nodes being administered.

Figure 2:
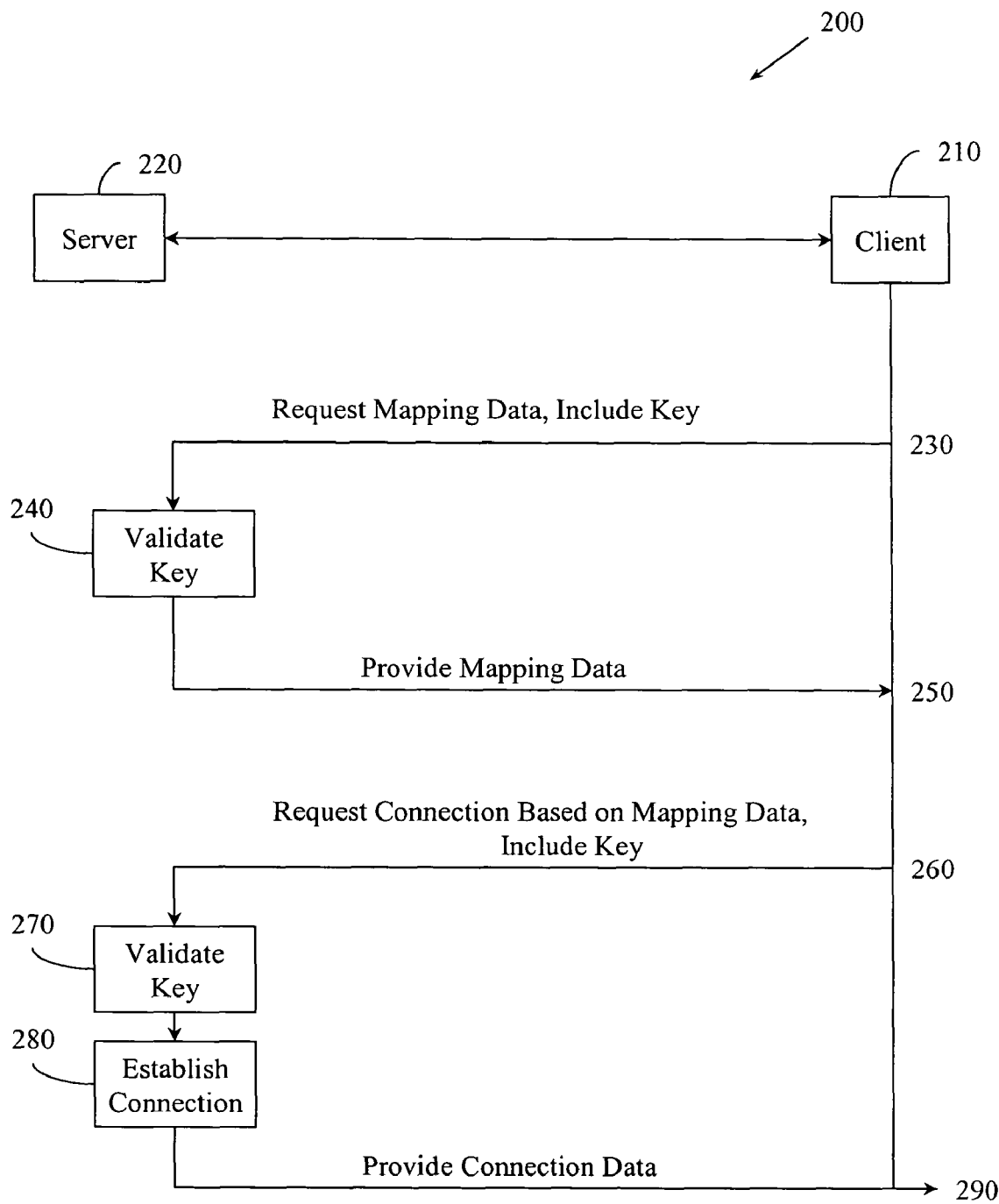
FIG. 2 illustrates example messages and actions associated with key-configured topology node communication.

FIG. 2 illustrates example messages and actions 200 associated with key-configured topology node communication. A client 210 may seek to connect to a server 220 to access a resource on the server 220. Thus, at 230, the client 210 may request mapping data from the server 220. If the client 210 has a key for establishing its membership in a key-configured topology group, then the request 230 may include that key. At 240, the server 220 may validate the key, and if the key is validated may provide, at 250, mapping data about mappings between resources and ports on the server 220. At 260, the client 210 may then request a connection to the server 220 based on the mapping data. The request will include the key for establishing membership in the key-configured topology group. At 270, the server 220 may then validate the key again, and if it is valid may, at 280, establish a connection between the client 210 and the server 220 using a networking protocol available to members of the key-configured topology group. In one example, the server 220 may then provide, at 290, a connection data to the client 210 that indicates that the connection was made. The connection data may include information about the connection (e.g., speed, protocol version, duration, packet size, packet cost), and the like.

Figure 3:
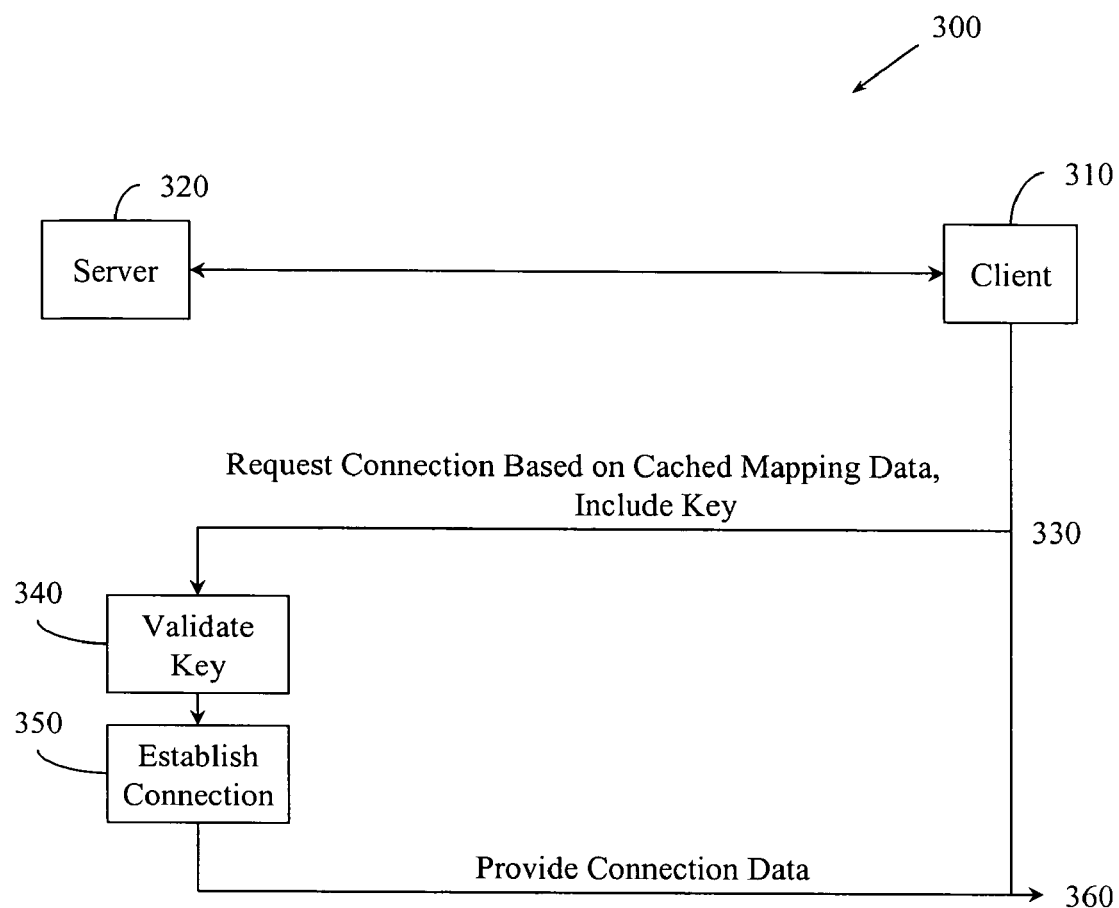
FIG. 3 illustrates example messages and actions associated with key-configured topology node communication.

FIG. 2 illustrates a scenario where a client seeks mapping data from a server before making a connection request. Since a port mapper may be available on both a client and a server, and since a port mapper may store previously acquired mapping data, in some cases a client may already have a cached port mapping data. Thus, FIG. 3 illustrates example messages and actions 300 associated with key-configured topology node communication where a client 310 has cached port mapping data concerning resources and ports on a server 320.

At 330, the client 310 may make a connection request based on the cached port mapping data. If the client 310 has a key for establishing its membership in a key-configured topology group to which server 320 belongs, then the request 330 may include that key. At 340, the server 320 will validate the key, and if the key validates establish a connection at 350 between the server 320 and the client 310. The server 320 may then provide, at 390, a connection data to the client 310 that indicates that the connection was made. By requiring that the key be presented in both a port mapping request as illustrated in FIG. 2 and in a connection request as illustrated in FIG. 3, key-configured topology connection management systems and methods may provide a multi-layered defense against undesired resource consumption. For example, if a server did not require a request connection to include a key, then a client that is spoofed after acquiring port mapping data might be able to acquire resources at the server in an unauthorized manner. In networking terminology, spoofing generally refers to ways that networking components like hardware and software can be fooled. IP spoofing, for example, involves making a message appear as if it came from one IP address when in fact it came from another IP address. Thus, a multi-layered key-configured topology connection management system that requires a key in both port mapping requests and connection requests can mitigate the effects of post-mapping data phase spoofing.

Figure 4:
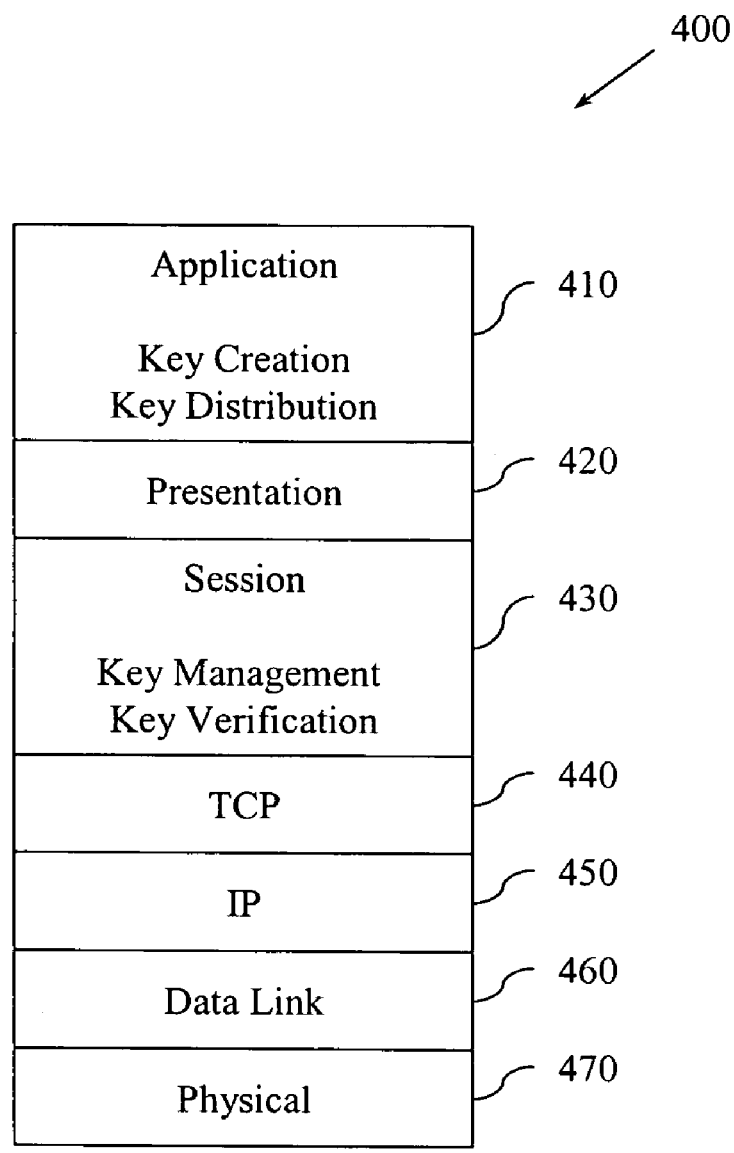
FIG. 4 illustrates an example computer networking protocol stack and indicates a location where key-configured topology connection management may occur.

FIG. 4 illustrates an example computer networking protocol stack 400. The protocol stack 400 includes a session layer 430 at which connection management for a key-configured topology may occur. The well-known OSI (open systems interconnect) protocol stack includes application, presentation, session, transport, network, data link, and physical layers. The example protocol stack 400 similarly contains an application layer 410, a presentation layer 420, a session layer 430, a TCP transport layer 440, an IP network layer 450, a data link layer 460, and a physical layer 470.

TCP is generally implemented at the transport layer of a computer networking protocol while IP is generally implemented at the network layer of a computer networking protocol. Thus a TCP layer 440 and an IP layer 450 are illustrated in stack 400. The session layer 430, at which key-based connection management services may be performed is logically located above the TCP layer 440 and the IP layer 450. Connection management services may include key creation, key management, key verification, and the like. Computer networking protocols that are based on TCP/IP and other similarly well-known, standards-based protocols may be referred to as open networks. While a seven layer protocol is illustrated, it is to be appreciated that protocols with a greater and/or lesser number of layers may be employed. Similarly, while a protocol that includes TCP/IP is illustrated, other open networks may be employed.

As described earlier, a client node and a server node may wish to communicate via a desired protocol like that illustrated by stack 400. To protect against undesired (e.g., unauthorized) resource consumption, the session layer 430 in a server node may examine incoming port mapping requests and/or connection requests for a key that establishes a requestor's membership in a key-configured topology group to which the server belongs. In one example, an application layer 410 may be involved in creating the key(s) and distributing the key(s). For example, a user may enter an alphanumeric passphrase into an application layer 410 application. The application may then internally generate a key using, for example, an encryption algorithm, a hashing algorithm, and other key generating algorithms. The application may then distribute the key to the session layer 430 at the server node and to selected client nodes. In one example the key may be stored in hardware in a client NIC or RNIC when the (R)NIC is manufactured while in another example the key may be dynamically stored in a data store on a client (R)NIC during a dynamic configuration. The keys can control group membership. Group membership may be predicated on factors like nodes sharing a common set of attributes like packet sizes, RDMA transmission sizes, and other attributes that make it likely that two nodes will be able to communicate effectively. Additionally, and/or alternatively, group membership may be predicated on factors like, nodes being interested in the same type of resource (e.g., data, processor, database), family relationship, and so on.

Figure 5:
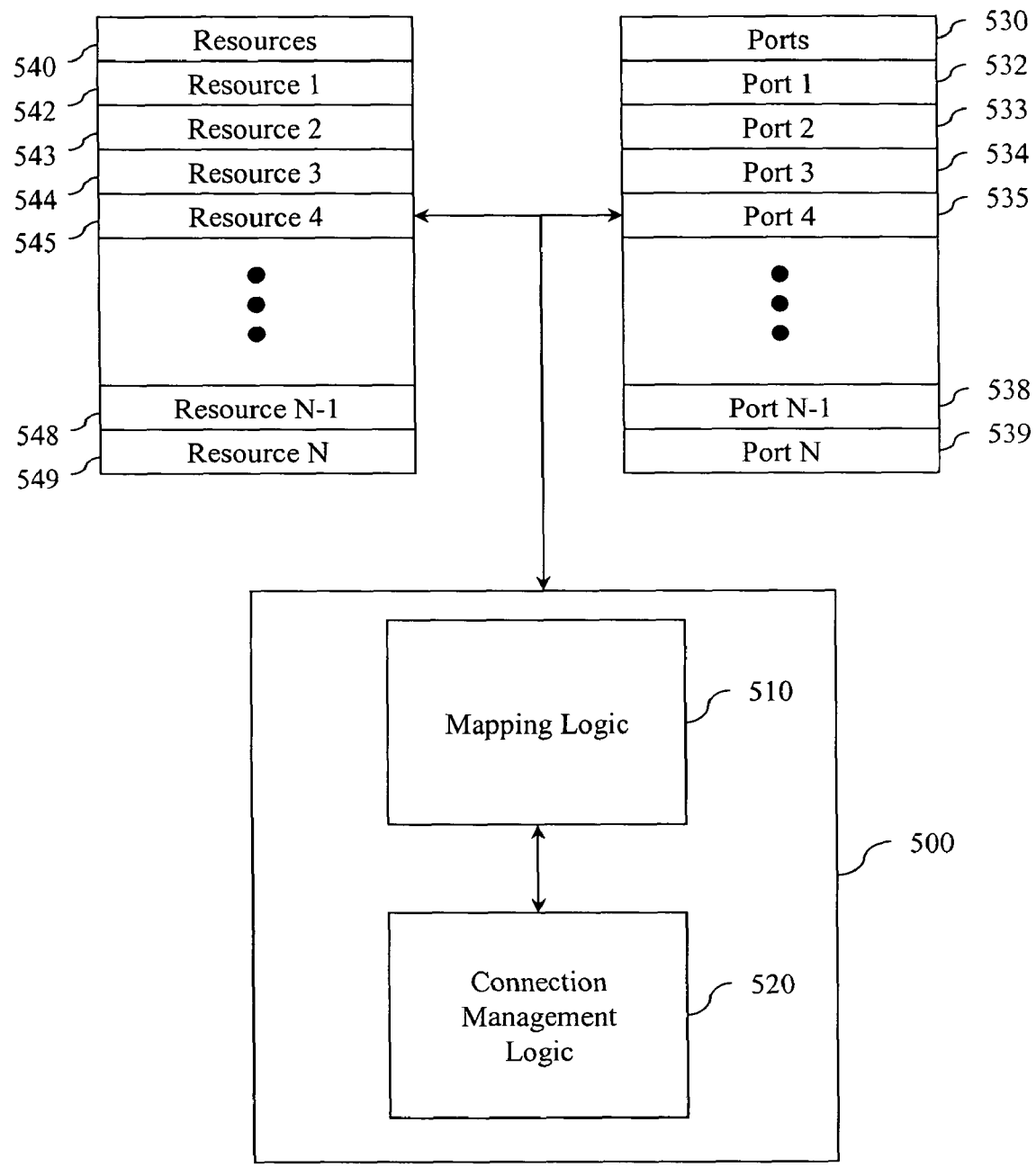
FIG. 5 illustrates an example system for providing key-configured topology connection management.

FIG. 5 illustrates an example system 500 for providing key-configured topology connection management. The system 500 includes a mapping logic 510 that is configured to produce a mapping between a resource located on a first node and a port located on the first node. For example, the mapping logic 510 may produce a mapping between members of resources 540 (e.g. resources 542-549) and members of ports 530 (e.g. port 532-539) which may reside on a node with the system 500. By way of illustration, a resource 542 may be mapped to a port 539 while another resource 545 may be mapped to a port 533. The mapping logic 510 may also be configured to selectively provide to a second node a mapping data that describes a mapping between a resource and a port. For example, a server node may provide an RDMA service. A first RDMA Interface may be located at a port 533 while memory on a server node RNIC may be located at resource 548. Thus, upon receiving a valid port mapping request, the mapping logic 510 may provide a requesting node with data that Identifies the port 533 through which the resource 548 may be accessed. In one example, the mapping logic 510 may be a port mapper configured to listen on a well-known port that listens for requests for mapping data on a server node.

The system 500 may also include a connection management logic 520 operably connected to the mapping logic 510. The connection management logic 520 may control whether the mapping logic 510 will provide mapping data to a requesting node. Additionally, and/or alternatively, the connection management logic 520 may control whether a connection that facilitates a requesting node accessing a resource in the server node via a first networking protocol will be established. In one example, the connection management logic 520 may control the mapping logic 510 based, at least in part, on the presence and validity of a key presented to the connection management logic 520 by the requesting node. The key is analyzed to determine whether the requesting node is a member of a key-configured topology group that includes the server node. In another example, the connection management logic 520 may exert its control based on factors like, time of day, network traffic, load, and resource availability. For example, while an authorized requesting node may seek access to a resource, two other authorized requesting nodes may already be accessing the resource, and the resource may be constrained by an access limit. Thus, the connection management logic 520 may control the mapping logic 510 to block the request, even though the requesting node has a valid key.

The connection management logic 520 may also facilitate establishing a fallback connection between a requesting node (e.g., client) and a receiving node (e.g., server) according to a second networking protocol. The fallback connection may be established to let the client node communicate with the server node but not using the protocol used by members of the key-configured topology and not to access the resource that can be accessed by members of the key-configured topology. A requesting node may request the fallback connection after the mapping logic 510 has been controlled to not provide the mapping data to the requesting node. Similarly, a requesting node may request the fallback connection after the mapping logic 510 has been controlled to prevent the establishment of a connection between the client node and the server node according to the first networking protocol.

The mapping logic 510 may provide information about and control access to, for example, resources that support RDMA between the first node and the second node. These resources may include, but are not limited to, computer memory, data communication connections, licenses, processor cycles, and so on. The mapping logic 510 and connection management logic 520 may be physically located, for example, on an (R)NIC. The connection management logic 520 may operate at a session layer associated with a networking protocol that members of the key-configured topology employ. The networking protocol may also include a TCP transport layer and an IP network layer.

Example methods may be better appreciated with reference to the flow diagrams of FIGS. 6 through 9. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

Figure 6:
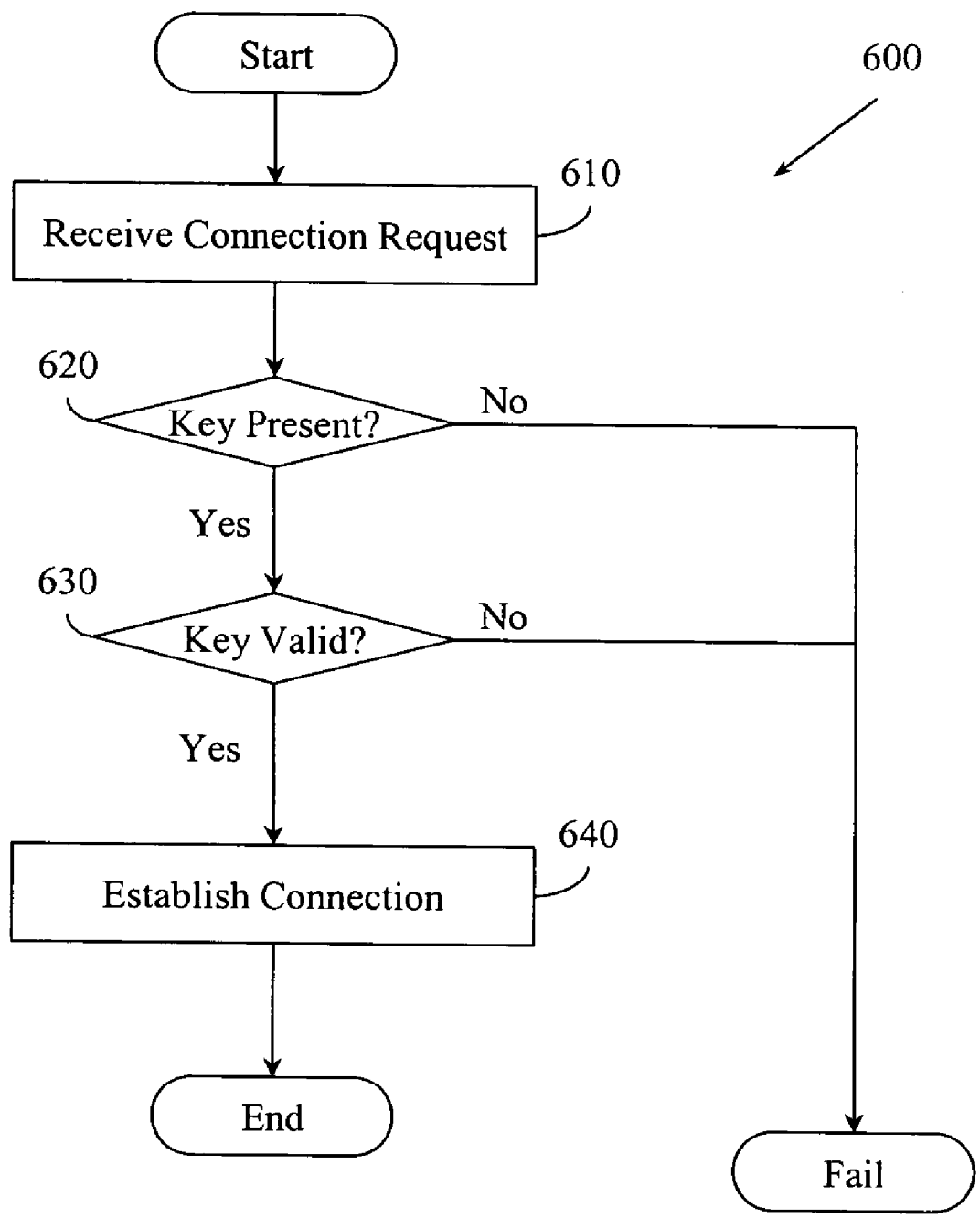
FIG. 6 illustrates an example server method for processing a connection request in a key-configured topology.

FIG. 6 illustrates an example server method 600 for processing a connection request in a key-configured topology. The method 600 may be performed, for example, by a first node like a server node on which a resource, a port, and a port mapper reside. In one example, the resource may be located on an (R)NIC associated with the server node. The resource may support RDMA between the client node and the server node. The method 600 may include, at 610, receiving from a second node like a client node (e.g., computer) a request to establish a connection between the client node and the server node. The connection request may be received via a preferred computer networking protocol available to members of a key-configured technology with connection management. Similarly, the request may be to open a connection to access a resource on the server node where the connection will use the preferred computer networking protocol.

The method 600 may also include, at 620, determining whether the request includes a key configured to establish that the client node is a member of a key-configured topology group that includes the server node. If the determination at 620 is Yes, then method 600 may proceed to 630, where it determines whether the key establishes valid membership for the client node in the key-configured topology group. If the determination at 630 is Yes, then the method 600 may selectively establish a connection at 640 as requested between the client node and the server node using the preferred computer networking protocol.

The method 600 may also include (not illustrated) the server node providing to the client node a communication that confirms that a connection was established between the client node and the server node via the preferred computer networking protocol. While client node and server node are used to describe a requesting node and a request receiving node, it is to be appreciated that a node like a computer may at one time be a logical server and/or receiver while at another time it may be a logical client and/or requestor.

While FIG. 6 illustrates various actions occurring in serial, it is to be appreciated that various actions illustrated in FIG. 6 could occur substantially in parallel. By way of illustration, a first process could receive connection requests, a second process could determine the existence and validity of a key in a connection request, and a third process could establish connections. While three processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to have a server node perform a method that includes receiving from a client node, via an open computer networking protocol that includes a TCP transport layer and an IP network layer, a request to establish a connection between the client node and the server node. The desired connection will preferably use the preferred computer networking protocol. The desired connection may facilitate the client node accessing a resource located on an (R)NIC associated with the server node, where the resource supports RDMA between the client node and the server node. The method may also include determining whether the request includes a key configured to establish that the client node is a member of a key-configured topology group that includes the server node and if the key is included, determining whether the key establishes valid membership for the client node in the key-configured topology group. The method may also include selectively establishing the connection between the client node and the server node via the preferred computer networking protocol. While this method is described being stored on a computer-readable medium, it is to be appreciated that other example methods described herein can also be stored on a computer-readable medium.

Figure 7:
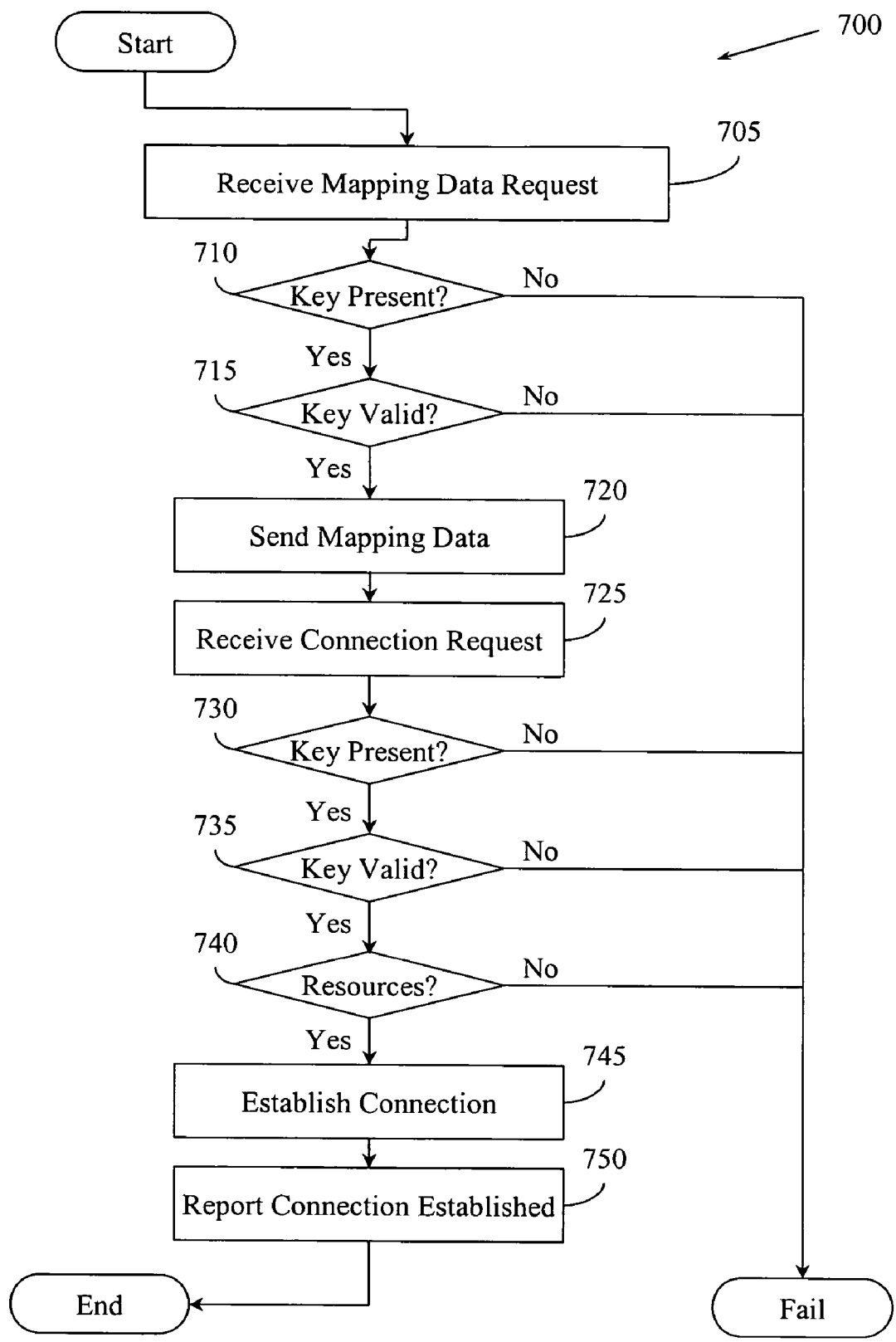
FIG. 7 illustrates another example server method for processing a connection request in a key-configured topology.

FIG. 7 illustrates another example server method 700 for processing a connection request in a key-configured topology. The method 700 includes, at 705, in a first node, receiving from a second node a request for port mapping data that describes a relationship between a resource on the first node and a port on the first node. At 710, a determination is made concerning whether the request includes a key that might establish membership for the second node in a key-configured topology group to which the first node belongs. If the determination is Yes, then at 715 a determination is made concerning whether the key validly establishes that membership.

At 720, the method 700 includes selectively providing mapping data to the second node. The mapping data is selectively provided based on the presence and validity of the key in the first request as determined at 710 and 715. In one example, the method 700 may terminate after 720. In another example, the method 700 may also include, at 725, receiving from the second node a second request to establish a connection between the first node and the second node via a first networking protocol. In one example, the first networking protocol includes a TCP transport layer and an IP network layer.

The requested connection may facilitate accessing a resource on the first node. In one example the resource may be located on an (R)NIC associated with the first node and/or may support RDMA between the first node and the second node. At 730, a determination is made concerning whether the connection request contains a key, and, at 735, whether that key establishes a valid membership for the second node in a key-configured topology group in which the first node is a member. While 710 and 715 are illustrated as separate actions, and while 730 and 735 are illustrated as separate actions, it is to be appreciated that in some examples these actions may be combined. The method 700 may also include, at 740, making a determination whether a resource is available. For example, the resource may already be being accessed by another member of a key-configured topology group and thus be temporarily unavailable.

The method 700 may therefore, at 745, selectively establish the connection based on the presence and validity of the key in the second request. Whether the connection is established may also be conditioned on the availability of the resource. In one example, the method 700 may include, at 750, providing a notification to the second node that the connection was established.

The method 700 may also include an action (not illustrated) of receiving from the second node a third request to establish a fallback connection between the first node and the second node. The third request may not include the key included in the second request and thus a connection granted in response to the third request may be made through a second protocol, different from the protocol available to members of the key-configured topology group to which the first node belongs. Furthermore the connection granted in response to the third request may not provide access to the resource available to members of the key-configured topology group to which the first node belongs.

While FIG. 7 illustrates various actions occurring in serial, it is to be appreciated that various actions illustrated in FIG. 7 could occur substantially in parallel. By way of illustration, a first process could receive mapping data requests, a second process could determine the presence and validity of a key in the port mapping data request, a third process could receive connection requests, a fourth process could determine the presence and validity of a key in the connection request, and a fifth process could selectively establish connections. While five processes are described, it is to be appreciated that a greater and/or lesser number of processes could be employed and that lightweight processes, regular processes, threads, and other approaches could be employed.

Figure 8:
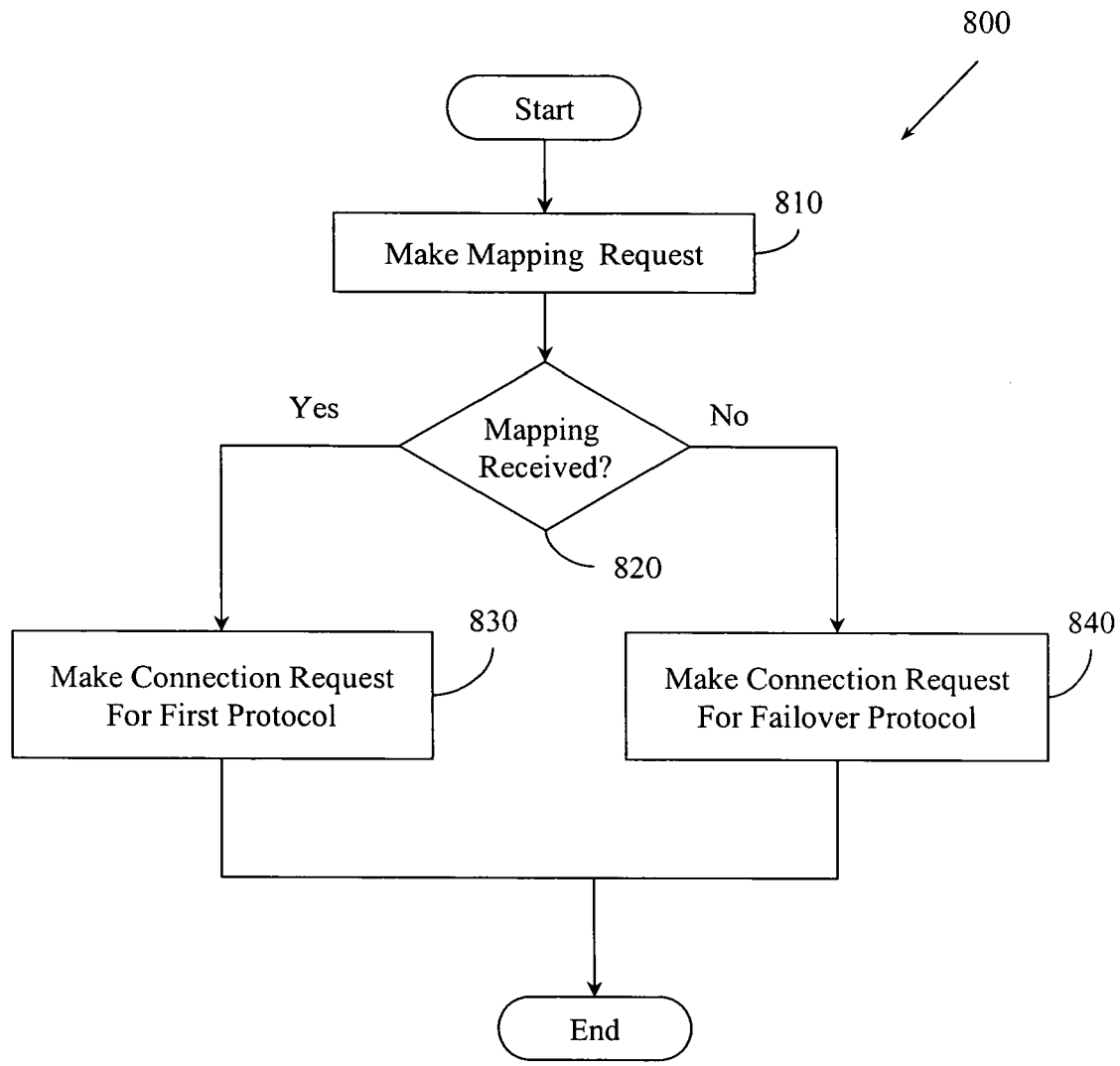
FIG. 8 illustrates an example client method for requesting a connection to a server node in a key-configured topology.

FIG. 8 illustrates an example client method 800 for requesting a connection to a server node in a key-configured topology. The method 800 may include, at 810, having the client make a first request for a mapping data. The first request may be sent to a well-known port on the server node. The mapping data may describe a port through which a resource (e.g., memory, processor cycles) on the server node can be accessed. The first request may include a key configured to identify the client node as a member of a key-configured topology group to which the server node belongs. The key may be, for example, a key generated by a key-configured topology connection manager and distributed to nodes that are to become members of the key-configured topology. The protocol by which the members of the key-configured topology may prefer to communicate may include a TCP transport layer and an IP network layer with a session layer configured to perform connection management services for the key-configured topology.

At 820, a determination is made concerning whether a response to the request for mapping data was received. If the determination at 820 is Yes, then at 830 a second request is made to the server node to establish a connection to a resource through the port via a first computer networking protocol. But if the determination at 820 is No, then at 840 a third request is made to the server node to establish a fallback connection to the server node via a second computer networking protocol. The second computer networking protocol is different from the first computer networking protocol and may not allow access to the resource that is available through the first computer networking protocol. While FIG. 8 illustrates various actions occurring in serial, it is to be appreciated that various actions illustrated in FIG. 8 could occur substantially in parallel.

Figure 9:
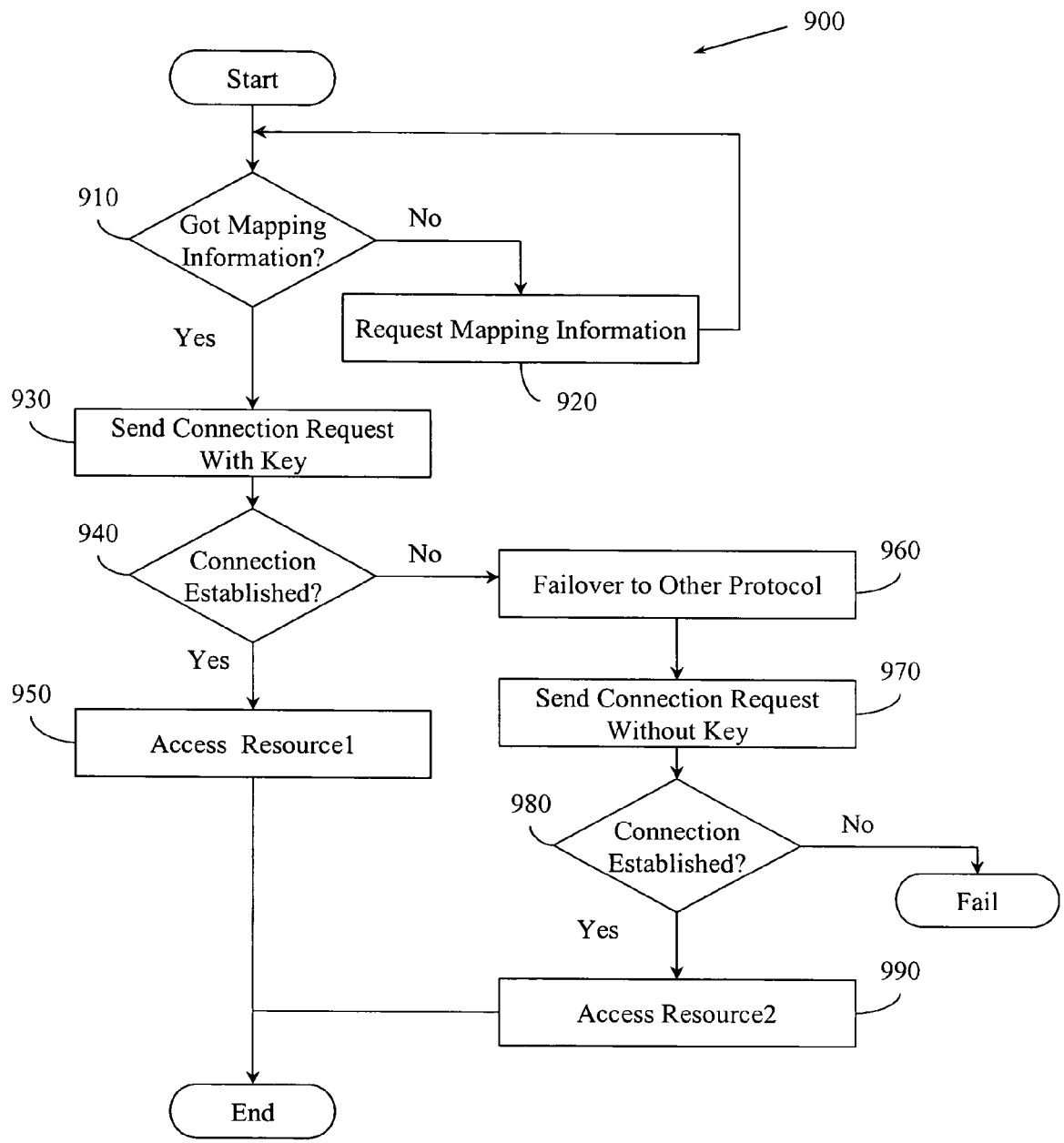
FIG. 9 illustrates another example client method for requesting a connection to a server node in a key-configured topology.

FIG. 9 illustrates an example client method 900 for requesting a connection in a key-configured topology. At 910, a client may determine whether it has cached mapping information for the server to which it wishes to connect. If the determination at 910 is No, then at 920 the client may request the mapping information. While FIG. 9 illustrates a loop between 910 and 920, it is to be appreciated that a retry-limit or other well known techniques may be applied to prevent an infinite loop.

Upon determining that mapping information is available, the client method 900 may, at 930, send a connection request to the server. The connection request will contain a key that the client hopes will establish its membership in a key-configured topology group to which the server belongs. The client may include the key because it is self-aware of the administration of the key-configured topology.

At 940, a determination is made concerning whether a connection has been made in response to the connection request sent at 930. While timing protocol actions are not illustrated, it is to be appreciated that various timing actions, interrupt actions, retry actions, and so on may be associated with waiting a period of time between action 930 and determination 940. If the determination at 940 is Yes, then at 950 the client may access a resource available to members of the key-configured topology group using a protocol available to members of the key-configured topology group. But if the determination at 940 is No, then at 960, the method 900 may fall back to a separate path and attempt to establish a different type of connection with the server. Thus, at 970, a connection request that does not include the key-configured topology membership key may be sent to the server. Once again, the client may not include the key because it is self-aware of the administration of the key-configured topology. At 980, a determination may be made concerning whether a fallback connection was established. If the determination is No, then the method 900 may enter a failure state while if the determination is Yes, then at 990, the client may interact with a second resource via a second protocol.

Figure 10:
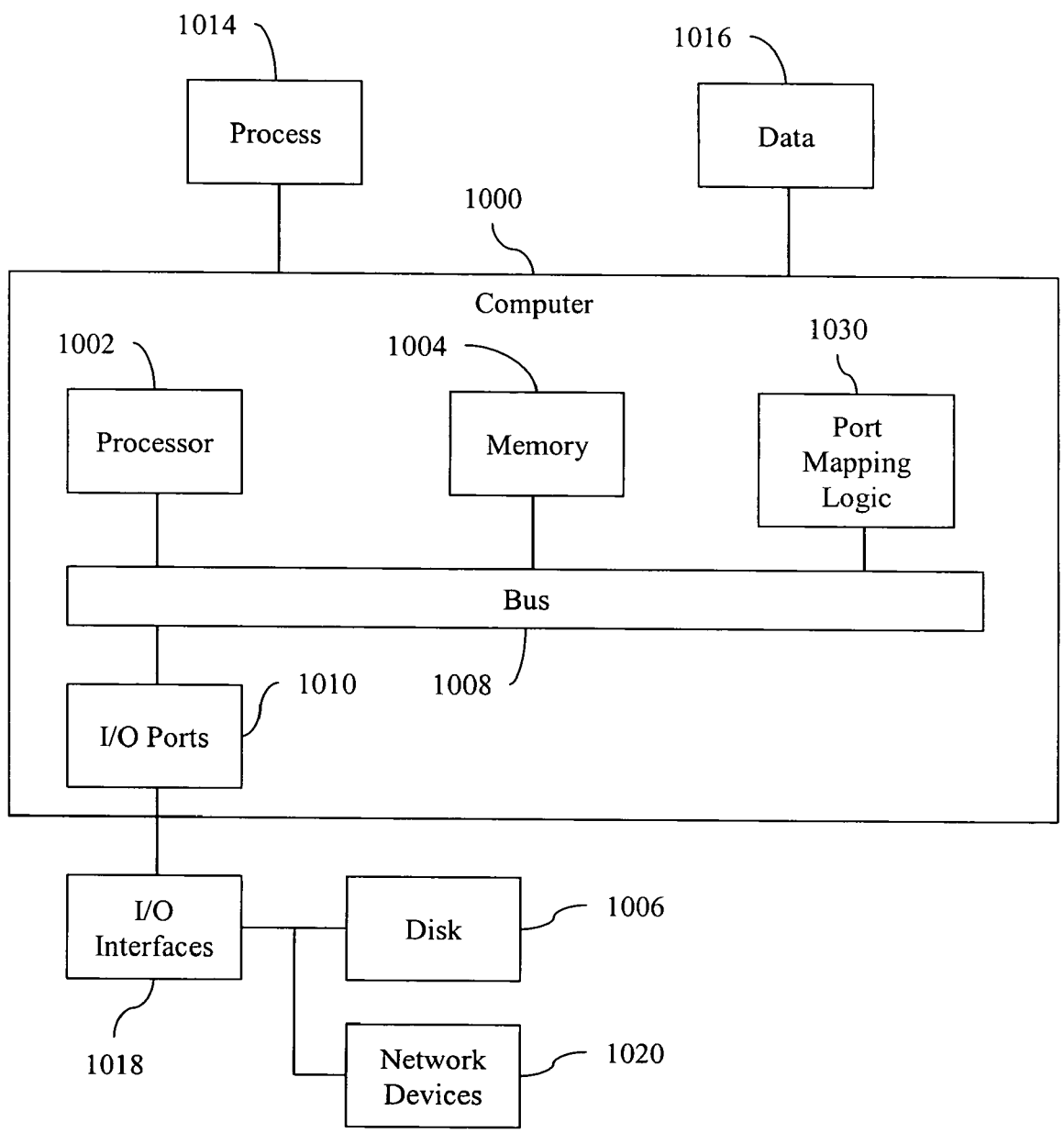
FIG. 10 illustrates an example computing environment in which example systems and methods illustrated herein can operate.

FIG. 10 illustrates a computer 1000 that includes a processor 1002, a memory 1004, and input/output ports 1010 operably connected by a bus 1008. In one example, the computer 1000 may include a port mapping logic 1030 configured to facilitate connection management in a key-configured topology. The port mapping logic 1030 may perform key-management functions like key creation, key reception, and so on. Similarly, the port mapping logic 1030 may perform key verification functions like detecting a key in a port mapping information request and validating a key when it is detected. While a port mapping logic 1030 is illustrated, it is to be appreciated that a resource to port mapping logic (not illustrated) and other similar logics may perform the key management and/or key verification functions separately and/or in conjunction with the port mapping logic 1030. Furthermore, while the port mapping logic 1030 is illustrated inside computer 1000, it is to be appreciated that the port mapping logic 1030 and/or a connection management logic (not illustrated) may be located in an input/output interface 1018 and/or a network device 1020.

The processor 1002 can be a variety of various processors including dual microprocessor and other multi-processor architectures. The memory 1004 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1006 may be operably connected to the computer 1000 via, for example, an input/output interface (e.g., card, device) 1018 and an input/output port 1010. The disk 1006 can include, but is not limited to, devices like a magnetic disk drive, a solid state disk drive, a floppy disk drive, a tape drive, a Zip drive, a flash memory card, and/or a memory stick. Furthermore, the disk 1006 can include optical drives like a CD-ROM, a CD recordable drive (CD-R drive), a CD rewriteable drive (CD-RW drive), and/or a digital video ROM drive (DVD ROM). The memory 1004 can store processes 1014 and/or data 1016, for example. The disk 1006 and/or memory 1004 can store an operating system that controls and allocates resources of the computer 1000.

The bus 1008 can be a single internal bus interconnect architecture and/or other bus or mesh architectures. While a single bus is illustrated, it is to be appreciated that computer 1000 may communicate with various devices, logics, and peripherals using other busses that are not illustrated (e.g., PCIE, SATA, Infiniband, 13104, USB, Ethernet). The bus 1008 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1000 may interact with input/output devices via i/o interfaces 1018 and input/output ports 1010. Input/output devices can include, but are not limited to, a keyboard, a microphone, a pointing and selection device, cameras, video cards, displays, disk 1006, network devices 1020, and the like. The input/output ports 1010 can include but are not limited to, serial ports, parallel ports, and USB ports.

The computer 1000 can operate in a network environment and thus may be connected to network devices 1020 via the i/o interfaces 1018, and/or the i/o ports 1010. Through the network devices 1020, the computer 1000 may interact with a network. Through the network, the computer 1000 may be logically connected to remote computers. The networks with which the computer 1000 may interact include, but are not limited to, a local area network (LAN), a wide area network (WAN), and other networks. The network devices 1020 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 1020 can connect to WAN technologies including, but not limited to, point to point links, circuit switching networks like integrated services digital networks (ISDN), packet switching networks, and digital subscriber lines (DSL).

Figure 11:
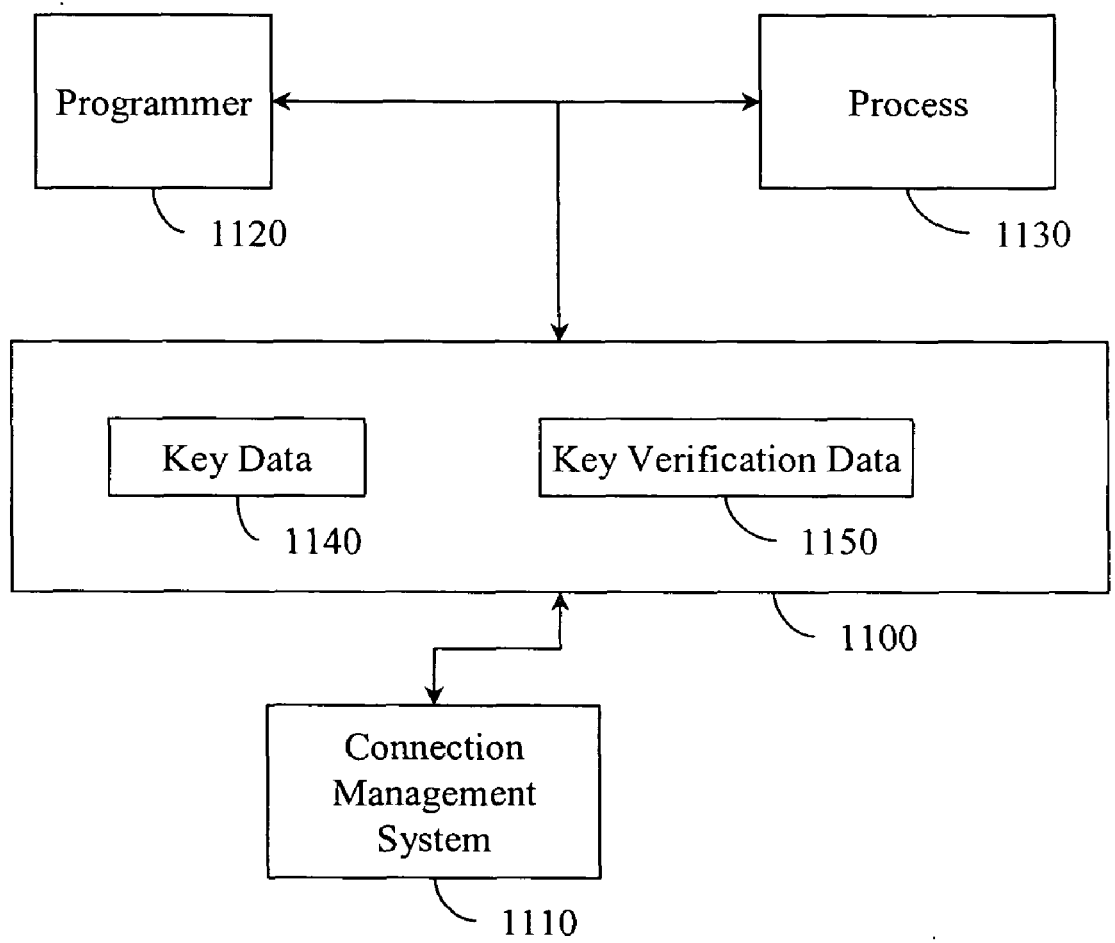
FIG. 11 illustrates an example application programming interface (API).

Referring now to FIG. 11, an application programming interface (API) 1100 is illustrated providing access to a connection management system 1110. The API 1100 can be employed, for example, by a programmer 1120 and/or a process 1130 to gain access to processing performed by the connection management system 1110. The processing may include, for example, key management, key verification, responding to port mapping requests, and establishing connections between nodes in a key-configured topology. A programmer 1120 can write a program to access the system 1110 (e.g., invoke its operation, monitor its operation, control its operation) where writing the program is facilitated by the presence of the API 1100. Rather than programmer 1120 having to understand the internals of the system 1110, the programmer 1120 merely has to learn the interface to the system 1110. This facilitates encapsulating the functionality of the system 1110 while exposing that functionality.

Similarly, the API 1100 can be employed to provide data values to the connection management system 1110 and/or to retrieve data values from the system 1110. For example, a process 1130 that supplies an internally generated key can provide the key to the system 1110 via the API 1100 by, for example, using a call provided in the API 1100. Thus, in one example of the API 1100, a set of application programming interfaces can be stored on a computer-readable medium. The interfaces can be employed by a programmer, computer component, logic, and so on to gain access to a connection management system 1110. The interfaces can include, but are not limited to, a first interface 1140 that communicates a key data, where the key data facilitates determining whether a client node is a member of a key-configured topology to which a server node belongs. The interfaces can also include a second interface 1150 that communicates a key verification data, where the key verification data may report on a key management and/or verification function performed by the connection management system 1110 on a key communicated via key data interface 1140.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method, comprising:

defining a key-configured topology group that identifies a group of member nodes that are authorized to communicate with each other, and for causing a group member key to be generated that validates membership of a node in the key-configured topology group;

in a first node, receiving from a second node, via a preferred computer networking protocol, a request to establish a connection between the first node and the second node via the preferred computer networking protocol, where the connection facilitates the second node having remote direct memory access to a resource associated with the first node;

determining whether the request includes a key;

if the key is included, determining whether the key is a valid group member key from the key-configured topology group and whether the second node is a member in the key-configured topology group; and performing one of, selectively establishing the connection between the first node and the second node via the preferred computer networking protocol that provides the second node remote direct memory access to the resource on the first node, and selectively refusing to establish the connection via the preferred computer networking protocol and instead permitting the connection via a fallback protocol if the key does not establish valid membership for the second node in the key-configured topology group, where the fallback protocol comprises a different protocol than the preferred computer networking protocol.

2. The method of claim 1, where the resource is located on one or more of, a network interface card (NIC), and a remote direct memory access (RDMA) NIC (RNIC) associated with the first node.

3. The method of claim 1, where the resource supports remote direct memory access (RDMA) between the first node and the second node.

4. The method of claim 1, where the method is performed by a session layer logic associated with the preferred computer networking protocol.

5. The method of claim 1, where the preferred computer networking protocol includes a Transmission Control Protocol (TCP) transport layer and an Internet Protocol (IP) network layer.

6. The method of claim 1, including the first node providing to the second node a communication that confirms that a connection was established between the first node and the second node via the preferred computer networking protocol.

7. A non-transitory computer-readable storage medium storing processor executable instructions operable to perform a method, the method comprising:

defining a key-configured topology group that identifies a group of member nodes that are authorized to communicate with each other, and for causing a key to be generated that validates membership of a node in the key-configured topology group;

in a first node, receiving from a second node, via a preferred computer networking protocol that includes a Transmission Control Protocol (TCP) transport layer and an Internet Protocol (IP) network layer, a request to establish a connection between the first node and the second node via the preferred computer networking protocol, where the connection facilitates the second node accessing a resource located on a remote direct memory access (RDMA) NIC (RNIC) associated with the first node and supports RDMA between the first node and the second node;

determining whether the request includes the key;

if the key is included, determining whether the key is a valid group member key from the key-configured topology group and whether the second node is a member node in the key-configured topology group; and performing one of, selectively establishing the connection between the first node and the second node via the preferred computer networking protocol that provides the second node remote direct memory access to the resource on the first node, and selectively refusing to establish the connection via the preferred computer networking protocol and instead permitting the connection via a fallback protocol if the key does not establish valid membership for the second node in the key-configured topology group, where the fallback protocol comprises a different protocol than the preferred computer networking protocol.

8. A non-transitory computer-readable storage medium storing processor executable instructions operable to perform a method, the method comprising:

in a first node, receiving from a second node a first request for a mapping data that describes a relationship between a resource on the first node and a port on the first node, where the resource is located on a remote direct memory access (RDMA) NIC (RNIC) associated with the first node and supports RDMA between the first node and the second node;

selectively providing the mapping data based on the presence and validity of a key in the first request, where the key is configured to establish that the second node is a member of a key-configured topology that includes the first node;

receiving from the second node a second request to establish a connection between the first node and the second node via a first networking protocol, where the connection facilitates accessing the resource and where the first networking protocol includes a Transmission Control Protocol (TCP) transport layer and an Internet Protocol (IP) network layer;

selectively establishing the connection based on the presence and validity of the key in the second request;

selectively providing a notification to the second node that the connection was established; and if the first request or second request is denied, receiving from the second node a third request to establish a fallback connection between the first node and the second node using a second networking protocol different from the first networking protocol, where the third request does not include the key and where a connection granted in response to the third request will not provide access to the resource via the first networking protocol.

9. A method, comprising:

from a client node, making a first request to a well-known port on a server node for a mapping data that describes a port through which a resource on the server node can be accessed, where the first request includes a key configured to identify the client node as a member of a key-configured topology group to which the server node belongs;

upon determining that the mapping data has been received, making a second request to the server node to establish a connection to the resource through the port via a first computer networking protocol; and upon determining that the mapping data has not been received, making a third request to the server node to establish a fallback connection to the server node via a second computer networking protocol, the second computer networking protocol being different from the first computer networking protocol.

10. The method of claim 9, where the resource is located on a remote direct memory access (RDMA) NIC (RNIC) associated with the server node.

11. The method of claim 9, where the resource supports remote direct memory access (RDMA) between the client node and the server node.

12. The method of claim 9, where the first computer networking protocol includes a Transmission Control Protocol (TCP) transport layer and an Internet Protocol (IP) network layer.

13. A system for preventing the unauthorized consumption of networking resources, comprising:

a hardware processor; a memory; a graphical user interface for defining a key-configured topology group that identifies a group of member nodes that are authorized to communicate with each other, and for causing a member key to be generated that validates membership of a node in the key-configured topology group;

a key management logic implemented in a computer-readable storage medium, configured to receive and store a key that is received from a first node as part of a request to access a memory of a second node; and a key verification logic implemented in the computer-readable storage medium, configured to determine whether the key received from the first node is a valid member key from the key-configured topology group and whether the first and second node are member nodes in the key-configured topology group;

where the key verification logic implemented in the computer-readable storage medium, is further configured to generate a first signal if the key is valid that causes a first connection to be established that allows the first node to have remote direct memory access to the memory of the second node and generate a second signal if the key is in invalid that causes a second connection to be established that allows the first node to have access to the second node according to a fallback protocol that does not provide direct remote memory access to the second node.

* * * * *